(12) United States Patent
Zhao

(10) Patent No.: US 11,427,439 B2
(45) Date of Patent: Aug. 30, 2022

(54) TENSION MEMBER FOR ELEVATOR SYSTEM BELT

(71) Applicant: Otis Elevator Company, Farmington, CT (US)

(72) Inventor: Chen Qian Zhao, Newark, DE (US)

(73) Assignee: OTIS ELEVATOR COMPANY, Farmington, CT (US)

(*) Notice: Subject to any disclaimer, the term of this patent is extended or adjusted under 35 U.S.C. 154(b) by 365 days.

(21) Appl. No.: 15/958,606

(22) Filed: Apr. 20, 2018

(65) Prior Publication Data

US 2018/0305177 A1 Oct. 25, 2018

Related U.S. Application Data

(60) Provisional application No. 62/487,794, filed on Apr. 20, 2017.

(51) Int. Cl.
| | | |
|---|---|---|
| *B66B 7/06* | (2006.01) | |
| *F16G 5/14* | (2006.01) | |
| *D07B 1/16* | (2006.01) | |
| *D07B 1/00* | (2006.01) | |
| *F16G 5/08* | (2006.01) | |
| *D07B 1/22* | (2006.01) | |

(52) U.S. Cl.
CPC .............. *B66B 7/062* (2013.01); *D07B 1/005* (2013.01); *D07B 1/162* (2013.01); *D07B 1/165* (2013.01); *D07B 1/22* (2013.01); *F16G 5/08* (2013.01); *F16G 5/14* (2013.01); *D07B 2201/2046* (2013.01); *D07B 2201/2083* (2013.01); *D07B 2205/2042* (2013.01); *D07B 2501/2007* (2013.01)

(58) Field of Classification Search
CPC ........ B66B 7/062; D07B 1/005; D07B 1/162; D07B 1/165; F16G 5/14
See application file for complete search history.

(56) References Cited

U.S. PATENT DOCUMENTS

| | | | |
|---|---|---|---|
| 6,886,666 B2 | 5/2005 | Stucky et al. | |
| 8,100,796 B2 * | 1/2012 | O'Donnell | D02G 3/447 |
| | | | 474/238 |
| 8,252,411 B2 * | 8/2012 | Veronesi | B66B 7/062 |
| | | | 294/74 |

(Continued)

FOREIGN PATENT DOCUMENTS

| | | | |
|---|---|---|---|
| EP | 2072447 A1 | 6/2009 | |
| EP | 2894119 B1 | 7/2015 | |

(Continued)

OTHER PUBLICATIONS

European Search Report Issued in EP Application No. 18168613.0, dated Oct. 24, 2018, 9 Pages.

(Continued)

*Primary Examiner* — Minh Truong
(74) *Attorney, Agent, or Firm* — Cantor Colburn LLP

(57) ABSTRACT

A belt for an elevator system includes a plurality of tension members arranged along a belt width and extending longitudinally along a length of the belt, each tension member including a plurality of load carrying fibers, the plurality of load carrying fibers including a plurality of aromatic polyester based fibers. A jacket material at least partially encapsulates the plurality of tension members.

10 Claims, 2 Drawing Sheets

(56) References Cited

U.S. PATENT DOCUMENTS

| | | |
|---|---|---|
| 9,126,805 B2 | 9/2015 | Pelto-Huikko et al. |
| 9,422,134 B2 | 8/2016 | Ikonen et al. |
| 9,546,447 B2 | 1/2017 | Wesson et al. |
| 2008/0078157 A1* | 4/2008 | Dold ................ D07B 1/025 57/212 |
| 2008/0081721 A1* | 4/2008 | Bissig ............... D07B 1/025 474/260 |
| 2010/0133046 A1 | 6/2010 | Allwardt et al. |
| 2011/0000746 A1 | 1/2011 | Pelto-Huikko et al. |
| 2011/0129647 A1* | 6/2011 | Duke, Jr ............. F16G 5/08 428/156 |
| 2011/0259677 A1 | 10/2011 | Dudde et al. |
| 2014/0345978 A1 | 11/2014 | Alasentie et al. |
| 2015/0101888 A1 | 4/2015 | Pelto-Huikko |
| 2015/0191332 A1* | 7/2015 | Kere ................. D07B 1/148 187/251 |
| 2015/0247025 A1 | 9/2015 | Ichikawa et al. |
| 2016/0083224 A1 | 3/2016 | Kere et al. |
| 2016/0207739 A1 | 7/2016 | Pelto-Huikko |
| 2017/0312939 A1* | 11/2017 | Lofgren ............. F16G 1/28 |

FOREIGN PATENT DOCUMENTS

| | | |
|---|---|---|
| KR | 101564194 B1 | 10/2015 |
| WO | 2006057641 A2 | 6/2006 |
| WO | 2011004071 A2 | 1/2011 |
| WO | 2011128223 A2 | 10/2011 |

OTHER PUBLICATIONS

European Office Action for European Application No. 18168613.0, dated Mar. 18, 2020, 6 pages.

* cited by examiner

TENSION MEMBER FOR ELEVATOR SYSTEM BELT

CROSS-REFERENCE TO RELATED APPLICATIONS

This application claims the benefit of 62/487,794, filed Apr. 20, 2017, which is incorporated herein by reference in its entirety.

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belts for supporting the elevator car and achieving the desired movement and positioning of the elevator car.

Where a belt is used as a load bearing member, a plurality of tension members, or cords, are embedded in a common jacket. The jacket retains the cords in desired positions and provide a frictional load path. In an exemplary traction elevator system, a machine drives a traction sheave with which the belts interact to drive the elevator car along a hoistway. Belts typically utilize tension members formed from steel elements, but alternatively may utilize tension members formed from synthetic fibers or other materials, such as carbon fiber composites.

In a carbon fiber composite tension member, the members have good strength to weight characteristics, but typically require large diameter sheaves due to limited flexibility of carbon fiber tension members.

BRIEF DESCRIPTION

In one embodiment, a belt for an elevator system includes a plurality of tension members arranged along a belt width and extending longitudinally along a length of the belt, each tension member including a plurality of load carrying fibers, the plurality of load carrying fibers including a plurality of aromatic polyester based fibers. A jacket material at least partially encapsulates the plurality of tension members.

Additionally or alternatively, in this or other embodiments the aromatic polyester fibers are formed from a liquid crystal polymer material.

Additionally or alternatively, in this or other embodiments the plurality of load carrying fibers includes at least 50% aromatic polyester fibers.

Additionally or alternatively, in this or other embodiments the plurality of load carrying fibers further includes one or more of carbon fibers, glass fibers, ultrahigh molecular weight polyethylene fibers, ultrahigh molecular weight polypropylene, polybenzoxazole fibers or nylon fibers.

Additionally or alternatively, in this or other embodiments the jacket materials are selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber and any combination of at least of two compound.

Additionally or alternatively, in this or other embodiments the plurality of load carrying fibers can also be positioned in a matrix material.

Additionally or alternatively, in this or other embodiments the matrix material is a polyurethane, vinylester, or epoxy material.

In another embodiment, an elevator system includes a hoistway, an elevator car located in the hoistway and movable therein, and a belt operably connected to the elevator car to suspend and/or drive the elevator car along the hoistway. The belt includes a plurality of tension members arranged along a belt width and extending longitudinally along a length of the belt, each tension member including a plurality of load carrying fibers. The plurality of load carrying fibers includes a plurality of aromatic polyester based fibers. A jacket material at least partially encapsulates the plurality of tension members.

Additionally or alternatively, in this or other embodiments the aromatic polyester fibers are formed from a liquid crystal polymer material.

Additionally or alternatively, in this or other embodiments the plurality of load carrying fibers includes at least 50% aromatic polyester fibers.

Additionally or alternatively, in this or other embodiments the plurality of load carrying fibers further includes one or more of carbon fibers, glass fibers, ultrahigh molecular weight polyethylene fibers, ultrahigh molecular weight polypropylene, polybenzoxazole fibers or nylon fibers.

Additionally or alternatively, in this or other embodiments the plurality of load carrying fibers are positioned in a matrix material.

Additionally or alternatively, in this or other embodiments the matrix material is a polyurethane, vinylester, or epoxy material.

In yet another embodiment, a tension member for an elevator system includes a plurality of load carrying fibers. The plurality of load carrying fibers includes a plurality of aromatic polyester based fibers Additionally or alternatively, in this or other embodiments the aromatic polyester fibers are formed from a liquid crystal polymer material.

Additionally or alternatively, in this or other embodiments the plurality of load carrying fibers includes at least 50% aromatic polyester fibers.

Additionally or alternatively, in this or other embodiments the plurality of load carrying fibers further includes one or more of carbon fibers, glass fibers, ultrahigh molecular weight polyethylene fibers, ultrahigh molecular weight polypropylene, polybenzoxazole fibers or nylon fibers.

Additionally or alternatively, in this or other embodiments the load carrying fibers are positioned in a matrix material.

Additionally or alternatively, in this or other embodiments the matrix material is a polyurethane, vinylester, or epoxy material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
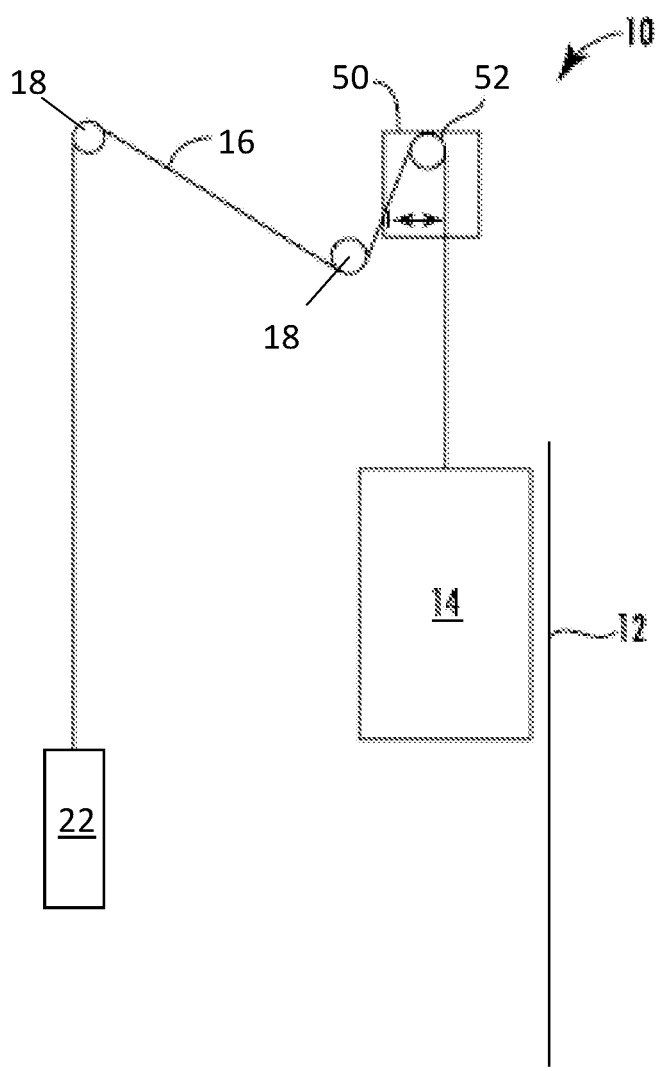
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves 18 could be a traction sheave 52. The traction sheave 52 is driven by a machine 50. Movement of drive sheave by the machine 50 drives, moves and/or propels (through traction) the one or more belts 16 that are routed around the traction sheave 52. At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
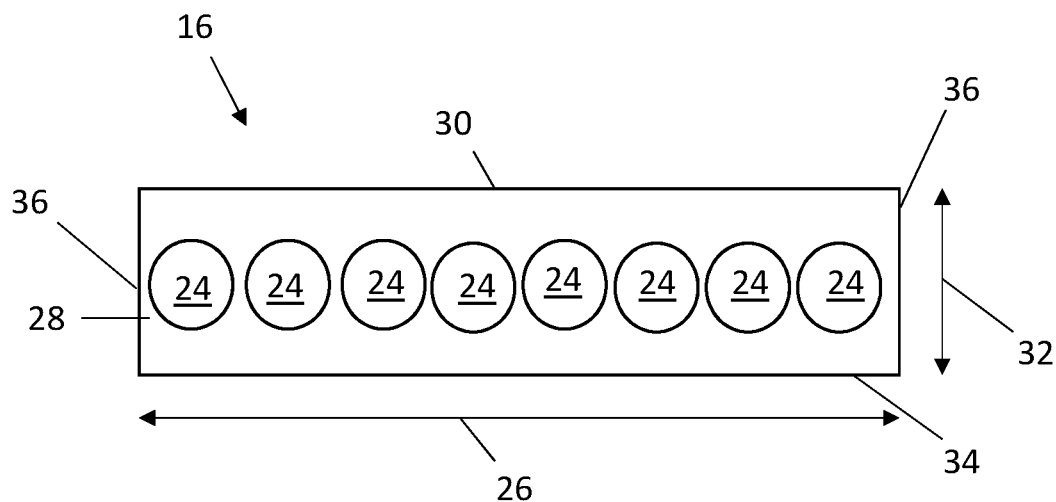
FIG. 2 is a schematic cross-sectional view of an embodiment of an elevator system belt.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket material 28 to restrain movement of the tension members 24 in the belt 16 and to protect the tension members 24. The jacket material 28 defines a traction side 30 configured to interact with a corresponding surface of the traction sheave 52. Exemplary materials for the jacket material 28 include the elastomers of thermoplastic polyurethanes, polyamide, thermoplastic polyester elastomers, and rubber, for example. Other materials may be used to form the jacket material 28 if they are adequate to meet the required functions of the belt 16. For example, a primary function of the jacket material 28 is to provide a sufficient coefficient of friction between the belt 16 and the traction sheave 52 to produce a desired amount of traction therebetween. The jacket material 28 should also transmit the traction loads to the tension members 24. In addition, the jacket material 28 should be wear resistant and protect the tension members 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While eight tension members 24 are illustrated in the embodiment of FIG. 2, other embodiments may include other numbers of tension members 24, for example, 6, 10 or 12 tension members 24. Further, while the tension members 24 of the embodiment of FIG. 2 are substantially identical, in other embodiments, the tension members 24 may differ from one another.

Figure 3:
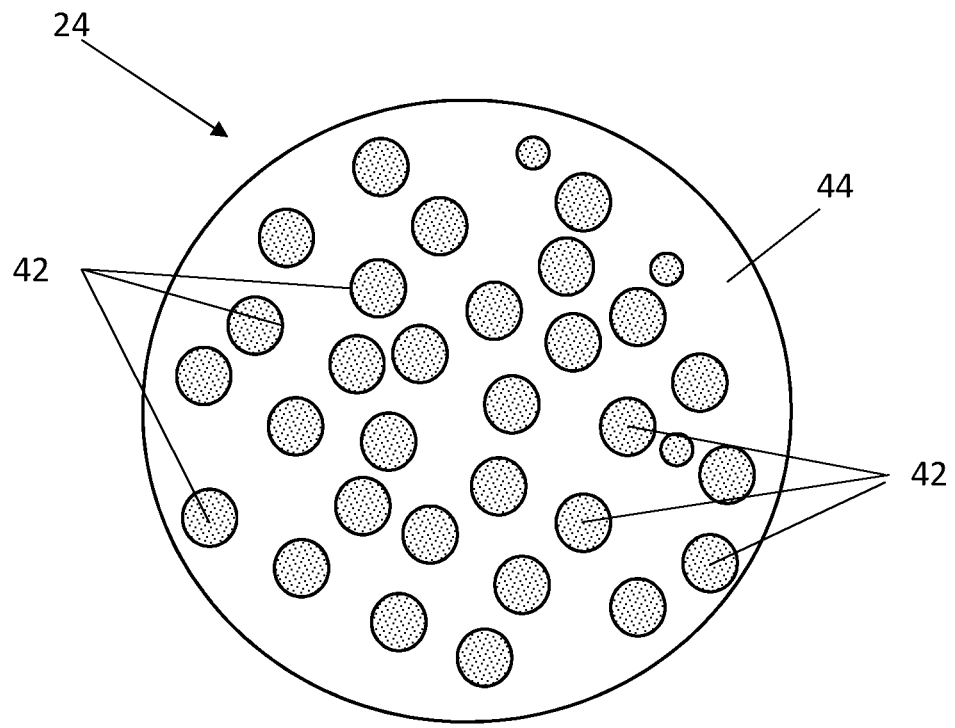
FIG. 3 is a schematic cross-sectional view of an embodiment of a tension member of an elevator system belt.

Referring now to FIG. 3, in some embodiments the tension members 24 each include a plurality of load carrying fibers 42. The load carrying fibers 42 include a liquid crystal polymer and/or carbon fibers and/or glass fibers and/or ultrahigh molecular weight polyethylene fiber and/or ultrahigh molecular weight polypropylene and/or polybenzoxazole fiber and/or nylon. Liquid crystal polymer is an aromatic polyester produced by polycondensation of 4-hydroxybenzoic acid and 6-hydroxynaphthalene-2-carboxylic acid. In some embodiments the liquid crystal polymer is a Vectran™ material. The liquid crystal polymer has a lower density than a typical carbon fiber, about 1.4 g/cm$^3$. Further the tensile strength of liquid crystal polymer is higher than that of typical carbon fiber profile, at about 3000-3200 Megapascals. In some embodiments, the tension member 24 includes the liquid crystal polymer and one or more of carbon fibers, glass fibers, ultrahigh molecular weight polyethylene, ultrahigh molecular weight polypropylene, polybenzoxazole fiber or nylon. Further, in some embodiments at least 50% of the fibers in the tension member 24 are aromatic polyester based fibers, such as the liquid crystal polymer.

In some embodiments, the load carrying fibers 42 are disposed in a matrix material 44. The matrix material 44 may be formed from, for example, a polyurethane, vinylester, and epoxy for example. The matrix material 44 is selected to achieve a desired stiffness and strength of the tension member 24 in combination with the load carrying fibers 42. While in the embodiment of FIG. 3, a matrix material 44 is illustrated, in some embodiments the matrix material 44 is omitted and the tension member 24 is formed as a so-called "dry fiber" configuration.

The tension member 24 may be formed as thin layers, in some embodiments by a pultrusion process. In a standard pultrusion process, the first load carrying fibers 42 are impregnated with the matrix material 44 and are pulled through a heated die and additional curing heaters where the matrix material 44 undergoes cross linking. A person having ordinary skill in the art will understand that controlled movement and support of the pulled load carrying fibers 42 may be used to form a desired linear or curved profile of the core member 40. In an exemplary embodiment, the tension member 24 has a cross-sectional thickness of about 0.5 millimeters to about 4 millimeters. In another embodiment, the tension member 24 has a cross-sectional thickness of 1 millimeter. Further, in some embodiments such as shown in FIG. 3, the tension member 24 has a circular cross-section, while in other embodiments the tension member 24 may have other cross-sectional shapes, such as rectangular, oval or elliptical.

Use of the aromatic polyester based fibers such as liquid crystal polymers in the tension member 24 reduces weight of the tension member 24 compared to a carbon fiber composite tension member 24, while also improving flexibility of the tension member 24, enabling reduced diameter sheaves 18 to be utilized in the elevator system 10.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
   a plurality of tension members arranged along a belt width and extending longitudinally along a length of the belt, each tension member including a plurality of load carrying fibers, the plurality of load carrying fibers including a plurality of aromatic polyester based fibers; and
   a jacket material at least partially encapsulating the plurality of tension members;
   wherein the plurality of load carrying fibers further includes ultrahigh molecular weight polypropylene fibers;
   wherein the plurality of tension members are formed via a pultrusion process with the plurality of load carrying fibers impregnated with a matrix material;
   wherein the plurality of load carrying fibers includes at least 50% aromatic polyester fibers.

2. The belt of claim 1, wherein the aromatic polyester fibers are formed from a liquid crystal polymer material.

3. The belt of claim 1, wherein the jacket materials are selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber and any combination of at least of two compound.

4. The belt of claim 1, wherein the matrix material is a polyurethane, vinylester, or epoxy material.

5. An elevator system, comprising:
   a hoistway;
   an elevator car disposed in the hoistway and movable therein;
   a belt operably connected to the elevator car to suspend and/or drive the elevator car along the hoistway, the belt including:
      a plurality of tension members arranged along a belt width and extending longitudinally along a length of the belt, each tension member including a plurality of load carrying fibers, the plurality of load carrying fibers including a plurality of aromatic polyester based fibers; and
      a jacket material at least partially encapsulating the plurality of tension members;
      wherein the plurality of load carrying fibers further includes ultrahigh molecular weight polypropylene fibers;
      wherein the plurality of tension members are formed via a pultrusion process with the plurality of load carrying fibers impregnated with a matrix material;
      wherein the plurality of load carrying fibers includes at least 50% aromatic polyester fibers.

6. The elevator system of claim 5, wherein the aromatic polyester fibers are formed from a liquid crystal polymer material.

7. The elevator system of claim 5, wherein the matrix material is a polyurethane, vinylester, or epoxy material.

8. A tension member for an elevator system, comprising a plurality of load carrying fibers, the plurality of load carrying fibers including a plurality of aromatic polyester based fibers;
   wherein the plurality of load carrying fibers further includes ultrahigh molecular weight polypropylene fibers;
   wherein the tension member is formed via a pultrusion process with the plurality of load carrying fibers impregnated with a matrix material;
   wherein the plurality of load carrying fibers includes at least 50% aromatic polyester fibers.

9. The tension member of claim 8, wherein the aromatic polyester fibers are formed from a liquid crystal polymer material.

10. The tension member of claim 8, wherein the matrix material is a polyurethane, vinylester, or epoxy material.

* * * * *